US008596588B1

(12) United States Patent
Sikkema et al.

(10) Patent No.: US 8,596,588 B1

(45) Date of Patent: Dec. 3, 2013

(54) CABLE AND WIRE MANAGEMENT DEVICE

(75) Inventors: Scott D. Sikkema, Grand Rapids, MI (US); Perry DeYoung, Ada, MI (US)

(73) Assignee: Viable Inc., Grand Rapids, MI (US)

( * ) Notice: Subject to any disclaimer, the term of this patent is extended or adjusted under 35 U.S.C. 154(b) by 728 days.

(21) Appl. No.: 12/701,280

(22) Filed: Feb. 5, 2010

Related U.S. Application Data

(60) Provisional application No. 61/150,583, filed on Feb. 6, 2009.

(51) Int. Cl.
*F16L 3/00* (2006.01)

(52) U.S. Cl.
USPC .. 248/58; 248/309.1; 248/205.1; 248/220.21; 248/558; 211/87.01; 211/70.6

(58) Field of Classification Search
USPC .................. 248/309.1, 300, 339, 317, 205.1, 248/225.11, 220.21, 215, 200, 340, 307, 248/301, 304, 303, 341, 322, 250, 235, 558, 248/911, 912, 126, 258; 211/4, 70.6, 85.7, 211/87.01, 106.01, 113; 362/239, 396, 391, 362/648, 151, 249.03, 249.07
See application file for complete search history.

(56) References Cited

U.S. PATENT DOCUMENTS

| | | | | | |
|---|---|---|---|---|---|
| 2,913,210 | A | * | 11/1959 | Tichnor | 248/220.42 |
| 3,047,158 | A | * | 7/1962 | Scholl | 211/85.17 |
| 3,310,271 | A | * | 3/1967 | King | 248/220.43 |
| 3,516,552 | A | * | 6/1970 | Salava | 211/106.01 |
| 4,094,415 | A | * | 6/1978 | Larson | 211/57.1 |
| 4,308,961 | A | * | 1/1982 | Kunce | 211/94.01 |
| 4,367,819 | A | * | 1/1983 | Lewis | 211/59.1 |
| 4,375,880 | A | * | 3/1983 | Sinclair | 248/223.41 |
| 4,434,960 | A | * | 3/1984 | Berry | 248/220.43 |
| 4,809,940 | A | * | 3/1989 | Trestyn | 248/220.22 |
| 5,240,209 | A | | 8/1993 | Kutsch | |
| 5,372,344 | A | * | 12/1994 | Syvuk | 248/225.11 |
| 5,383,318 | A | | 1/1995 | Kelley et al. | |
| 5,697,590 | A | * | 12/1997 | Hull et al. | 248/225.11 |
| 5,697,811 | A | | 12/1997 | Pickles et al. | |
| 5,740,927 | A | * | 4/1998 | Yemini | 211/70.6 |
| 5,794,895 | A | | 8/1998 | Besserer et al. | |
| 5,886,295 | A | | 3/1999 | Carino et al. | |
| 5,893,539 | A | | 4/1999 | Tran et al. | |
| 5,902,961 | A | | 5/1999 | Viklund et al. | |

(Continued)

FOREIGN PATENT DOCUMENTS

| | | | |
|---|---|---|---|
| EP | 1615312 | A1 | 1/2006 |
| GB | 2316859 | A | 3/1998 |
| WO | 9744605 | A1 | 11/1997 |

*Primary Examiner* — Kimberly Wood

(74) *Attorney, Agent, or Firm* — McGarry Bair PC

(57) ABSTRACT

A cable and wire management device comprises a track and a plurality of hook members defining a runway for supporting cables and wires parallel to a horizontal axis when mounted adjacent to one another within the track. Each of the plurality of hook members can comprise a first and second mounting tab for selectively mounting the hook member to the track by at least one of the first and second mounting tabs. One of the first and second mounting tabs can be positioned on the plurality of hook members to mount the hook members to the track when the track is mounted to a vertical surface and the other of the first and second mounting tabs mounts the hook members to the track when the track is mounted to a horizontal surface such that the runway is parallel to the horizontal axis.

18 Claims, 6 Drawing Sheets

(56) References Cited

U.S. PATENT DOCUMENTS

| | | | |
|---|---|---|---|
| 5,921,402 | A * | 7/1999 | Magenheimer ................. 211/26 |
| 5,971,508 | A | 10/1999 | Deimen et al. |
| 6,137,057 | A | 10/2000 | Gutgsell |
| 6,170,784 | B1 | 1/2001 | MacDonald et al. |
| 6,175,079 | B1 | 1/2001 | Johnston et al. |
| 6,215,069 | B1 | 4/2001 | Martin et al. |
| 6,364,255 | B1 | 4/2002 | Carrick et al. |
| 6,365,834 | B1 | 4/2002 | Larsen et al. |
| 6,378,811 | B1 | 4/2002 | Potter et al. |
| 6,410,855 | B1 | 6/2002 | Berkowitz et al. |
| 6,427,952 | B2 | 8/2002 | Caveney et al. |
| 6,429,376 | B1 | 8/2002 | Mendoza |
| 6,471,080 | B1 * | 10/2002 | Hoffmann .................. 211/126.1 |
| 6,476,327 | B1 | 11/2002 | Bernard et al. |
| 6,504,100 | B2 | 1/2003 | Lawrence et al. |
| 6,578,498 | B1 | 6/2003 | Draudt et al. |
| 6,629,675 | B1 | 10/2003 | Bjorklund et al. |
| 6,686,541 | B2 | 2/2004 | Chan |
| 6,715,719 | B2 | 4/2004 | Nault et al. |
| 6,728,461 | B1 | 4/2004 | Senatore et al. |
| 6,902,069 | B2 | 6/2005 | Hartman et al. |
| 7,075,010 | B2 | 7/2006 | Santelli, Jr. |
| 7,258,583 | B1 | 8/2007 | Baiza |
| 7,391,625 | B2 | 6/2008 | Mendoza |
| 2002/0003194 | A1 | 1/2002 | Simmons |
| 2003/0051892 | A1 | 3/2003 | Mattei et al. |
| 2004/0026558 | A1 | 2/2004 | Murphy |
| 2005/0236544 | A1 | 10/2005 | Mancino et al. |
| 2006/0018622 | A1 | 1/2006 | Caveney et al. |
| 2006/0102054 | A1 | 5/2006 | Warriner |
| 2007/0007397 | A1 | 1/2007 | Nelson |
| 2007/0257158 | A1 | 11/2007 | Caveney et al. |
| 2008/0015591 | A1 | 1/2008 | Castaneda et al. |
| 2008/0017760 | A1 | 1/2008 | Larsen et al. |
| 2008/0151524 | A1 | 6/2008 | Kelly et al. |

* cited by examiner

CABLE AND WIRE MANAGEMENT DEVICE

CROSS-REFERENCE TO RELATED APPLICATION

This application claims the benefit of U.S. Provisional Patent Application No. 61/150,583, filed Feb. 6, 2009, which is incorporated herein by reference in its entirety.

BACKGROUND OF THE INVENTION

The invention generally relates to devices for managing and organizing cables and wires associated with electronic equipment.

Electronic equipment such as computers, fax machines, printers and related peripheral components such as keyboards, monitors, speakers, etc. have multiple cables and wires connecting the various pieces of equipment and related components. The multitude of wires and cables can quickly lead to a mass of tangled wires and cables that can be unsightly and present a hazard for tripping users or catching on other items such as chairs. This situation is especially common in an office or other business and/or residential setting.

There are several types of cable and wire management devices that attempt to solve the above identified problem. One type of management device, such as described in U.S. Pat. No. 5,921,402 to Magenheimer and U.S. Patent Application No. 2004/0026558 to Murphy includes hooks that can be movably mounted to a track that can be mounted to a vertical surface. While these types of devices are capable of supporting cables and wires, these devices do not appear capable of accommodating additional peripheral equipment such as powers strips, power supplies, routers, etc. In addition, neither of these devices is capable of supporting cables or wires when the track is mounted underneath a horizontal surface, such as the underside of a desk or table. The ability to be mounted to the underside of a desk or table is especially useful in home or business office settings where a vertical surface, such as a wall, is unavailable and/or inconvenient.

Another type of management device includes individual hooks or rings that are fixedly mounted to a track or other surface. U.S. Pat. No. 6,378,811 to Potter et al., U.S. Pat. No. 6,427,952 to Caveney et al. and WO1997/44605 to Carlson disclose hooks that can be fixedly mounted directly to a surface or track. U.S. Pat. No. 5,893,539 to Tran et al. and U.S. Pat. No. 6,629,675 to Bjorklund et al. disclose hooks or rings fixedly mounted to a support track. Devices such as the type disclosed by U.S. Pat. Nos. 6,378,811, 5,893,539 and 6,629,675 do not appear capable of accommodating additional peripheral equipment, such as power strips, nor are they capable of supporting cables or wires when mounted underneath a horizontal surface. While devices such as those described by U.S. Pat. No. 6,427,952, WO1997/44605 may be capable of supporting cables or wires when mounted underneath a horizontal surface, they do not appear capable of supporting additional peripheral equipment.

Yet another type of management device includes a cavity or trough mounted to a surface such as those disclosed in U.S. Pat. No. 7,258,583 to Baiza, U.S. Pat. No. 7,075,010 to Santelli, Jr., U.S. Pat. No. 5,971,508 to Deimen et al., and U.S. Pat. No. 6,137,057 to Gutgsell. While these devices are capable of being mounted underneath a horizontal surface, they do not appear capable of accommodating additional peripherals such as power strips. In addition, devices such as those disclosed by U.S. Pat. Nos. 7,075,010, 5,971,508 and 6,137,057 are only open at the ends, limiting the ability of wires or cables to enter or exit the device to only the ends, which can makes these types of devices difficult and cumbersome to use.

SUMMARY OF AN EMBODIMENT OF THE INVENTION

According to one embodiment, a cable and wire management device comprises a track and a plurality of hook members defining a runway for supporting cables and wires parallel to a horizontal axis when mounted adjacent to one another within the track. Each of the plurality of hook members can comprise a first mounting tab and a second mounting tab for selectively mounting the hook member to the track by either the first mounting tab or the second mounting tab. One of the first and second mounting tabs can be positioned on the plurality of hook members to mount the hook members to the track when the track is mounted to a vertical surface and the other of the first and second mounting tabs mounts the hook members to the track when the track is mounted to a horizontal surface such that the runway is parallel to the horizontal axis and wherein the plurality of hook members can be located next to one another by abutting at least one of the first and second mounting tabs of adjacent hook members against one another to provide uniform spacing for the plurality of hook members along a length of track.

According to another embodiment, the cable and wire management device comprises a gap between adjacent hook members defining an exit and entry point to the runway. The width of the exit and entry point is defined by the length of at least one of the first and second mounting tabs. When a plurality of hook members are mounted to the track, the gaps between adjacent hook members define multiple exit and entry points to the runway.

According to still another embodiment, one of the plurality of hook members comprises a generally elongated body with a first member extending laterally from a first end thereof and a second member extending laterally in the same direction from a second end thereof, the second member having an upturned end at an outer end thereof. One of the first and second mounting tabs is mounted to the first member, and the other of the first and second mounting tabs is mounted to the elongated body According to another embodiment, at least one of the first and second mounting tabs can be provided with an interlocking feature that is received by a corresponding interlocking feature on at least one of the first and second mounting tabs of an adjacent hook member.

According to another embodiment, the runway is sized so as to receive at least one cable, wire, cord, power strip, USB port expander, router, power supply and combinations thereof. The track can be mounted to a horizontal surface such as a desk, table or countertop. The track can comprise mounting brackets for mounting to a wall partition or screws for mounting to the vertical or horizontal surface.

According to another embodiment of the invention, the cable and wire management device comprises a hook member comprising a generally elongated body with a first member extending laterally from a first end thereof and a second member extending laterally in the same direction from a second end thereof, wherein the second member has an upturned end at an outer end thereof, a first mounting tab and a second mounting tab. The first mounting tab can be mounted atop the first member and extend dimensionally beyond the width of the first member between ends of the first member and the second mounting tab can be mounted atop the elongated body and extend dimensionally beyond the width of the elongated body between ends of the elongated body. The first and second mounting tabs are generally planar in configuration and the first mounting tab is positioned on the device in a plane generally orthogonal to the second mounting tab.

According to another embodiment, the cable and wire management device can further comprise a track defining a raceway sized to receive at least one of the first and second mounting tabs. The track provides a runway for supporting cables and wires parallel to a horizontal axis when a plurality of the hook members are mounted adjacent to one another within the track.

According to another embodiment, one of the first and second mounting tabs mounts the hook members to the track when the track is mounted to a vertical surface and the other of the first and second mounting tabs mounts the hook members to the track when the track is mounted to a horizontal surface such that the runway is parallel to the horizontal axis. When a plurality of hook members are mounting to the track, the plurality of hook members can be located next to one another by abutting at least one of the first and second mounting tabs of adjacent hook members against one another to provide uniform spacing for the plurality of hook members along the length of the track.

The cable and wire management device according to the embodiments of the invention provides a device that can support cables and wires along with additional peripheral equipment such as power strips, power supplies, routers, modems, etc. In addition the cable and wire management device according to the invention can support the cables, wires and peripheral equipment when mounted either to a vertical surface, such as a wall, or underneath a horizontal surface, such as the underside of desk. The inventive cable and wire management device is provided with easy access exit and entry points for cables and wires along the entire length of the device.

DESCRIPTION OF EMBODIMENTS OF THE INVENTION

Figure 1:
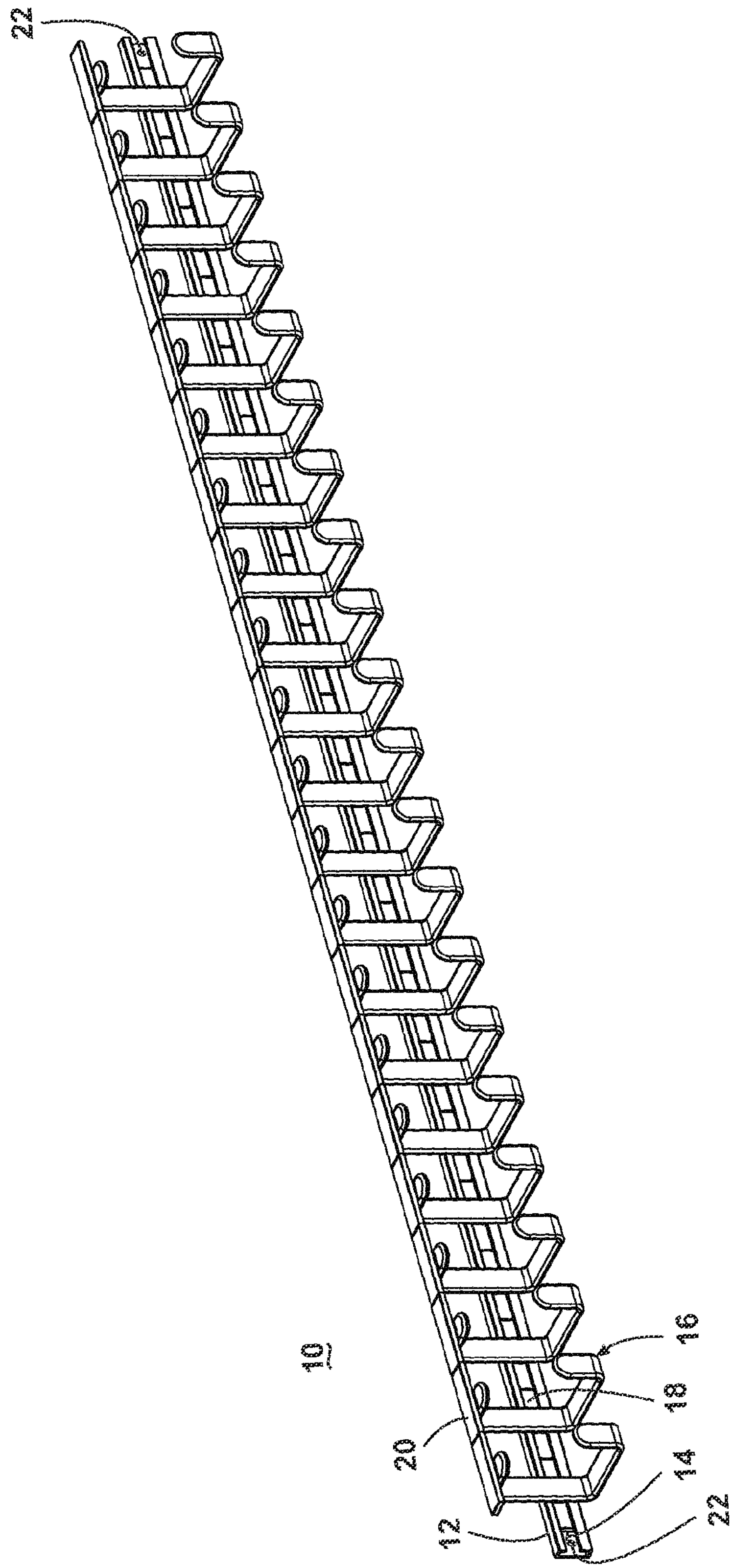
FIG. 1 is a perspective view of a cable and wire management device according to a first embodiment of the invention.

FIG. 1 illustrates a cable and wire management device 10 according to an example embodiment of the invention. The cable and wire management device 10 comprises a track 12 having a raceway 14 supporting a plurality of hook members 16. Each hook member 16 has a first mounting tab 18 and a second mounting tab 20 for mounting the hook member to the track 12. While the device 10 is described as a cable and wire management device, it will be understood that the cable and wire management device 10 can be used to manage any type of cable, wire, cord, power strip, router, USB port expander, power supply and any other related electrical and office supply equipment.

The track 12 can be made from any rigid material including metal, such as aluminum, or plastic, and can be provided in any suitable length, such as three or four foot long lengths, for example. The track 12 can also be provided with one or more mounting apertures 22 at each end of the track 12 for securing the track 12 to a surface. The track 12 can be secured to a surface through the apertures 22 by any suitable type of mechanical fastener, such as a screw, for example.

Additionally, each end of the track 12 can also be provided with mounting brackets that can be used to mount the track 12 to various types of office furniture panels. The mounting brackets can be integrally formed with the track 12 or be removably coupled with the track 12. For example, the mounting brackets can be provided with a mounting tab sized to be slidingly received within the raceway 14 of the track 12. Alternatively, the mounting bracket may be provided with apertures for mounting to a surface using a mechanical fastener such as a screw.

Figure 2:
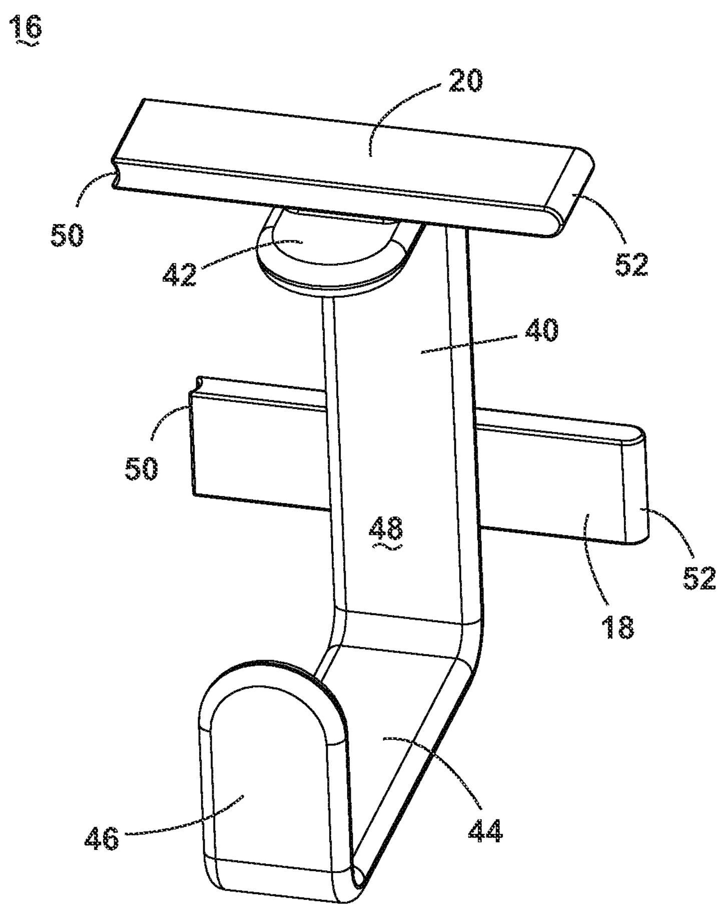
FIG. 2 is a perspective view of a hook member of the cable and wire management device of FIG. 1.

Referring now to FIG. 2, the hook member 16 is generally J-shaped and can comprise a first vertical leg or body 40 connected with a first horizontal leg 42 at one end and a second horizontal leg 44 at a second end. The second horizontal leg 44 can be connected with a second, upturned vertical leg 46 at an end opposite the first vertical leg 40. The first mounting tab 18 is located on a rear face of the first vertical leg 40; the second mounting tab 20 is located on an upper face of the first horizontal leg 42. The first and second vertical legs 40, 46 and the first and second horizontal legs 42, 44 define a runway 48 for receiving wires, cords, power strips, USB port expanders, power supplies and other related electrical and office supply equipment. The length of the legs 40, 42, 44 and 46 can be selected such that the desired electrical and office supply equipment can easily be placed in and withdrawn from the runway 48.

The first and second mounting tabs 18, 20 can be connected with the first vertical and horizontal legs 40, 42, respectively by a weld or other type of non-mechanical fastener, such as an adhesive, or any suitable type of mechanical fastener, such as a pin or screw. The first and second mounting tabs 18, 20 are sized to be slidingly received within the raceway 14 of the track 12 and can be provided with a first and second interlocking feature 50, 52 on each end. The first interlocking feature 50 can be in the form of a hollowed out groove or indent on a first end of the first mounting tab 18 and a first end of the second mounting tab 20. The second interlocking feature 52 can be provided opposite the first interlocking feature 50 in the form of a tapered or beveled edge of the first and second mounting tabs 18, 20.

Figure 3A:
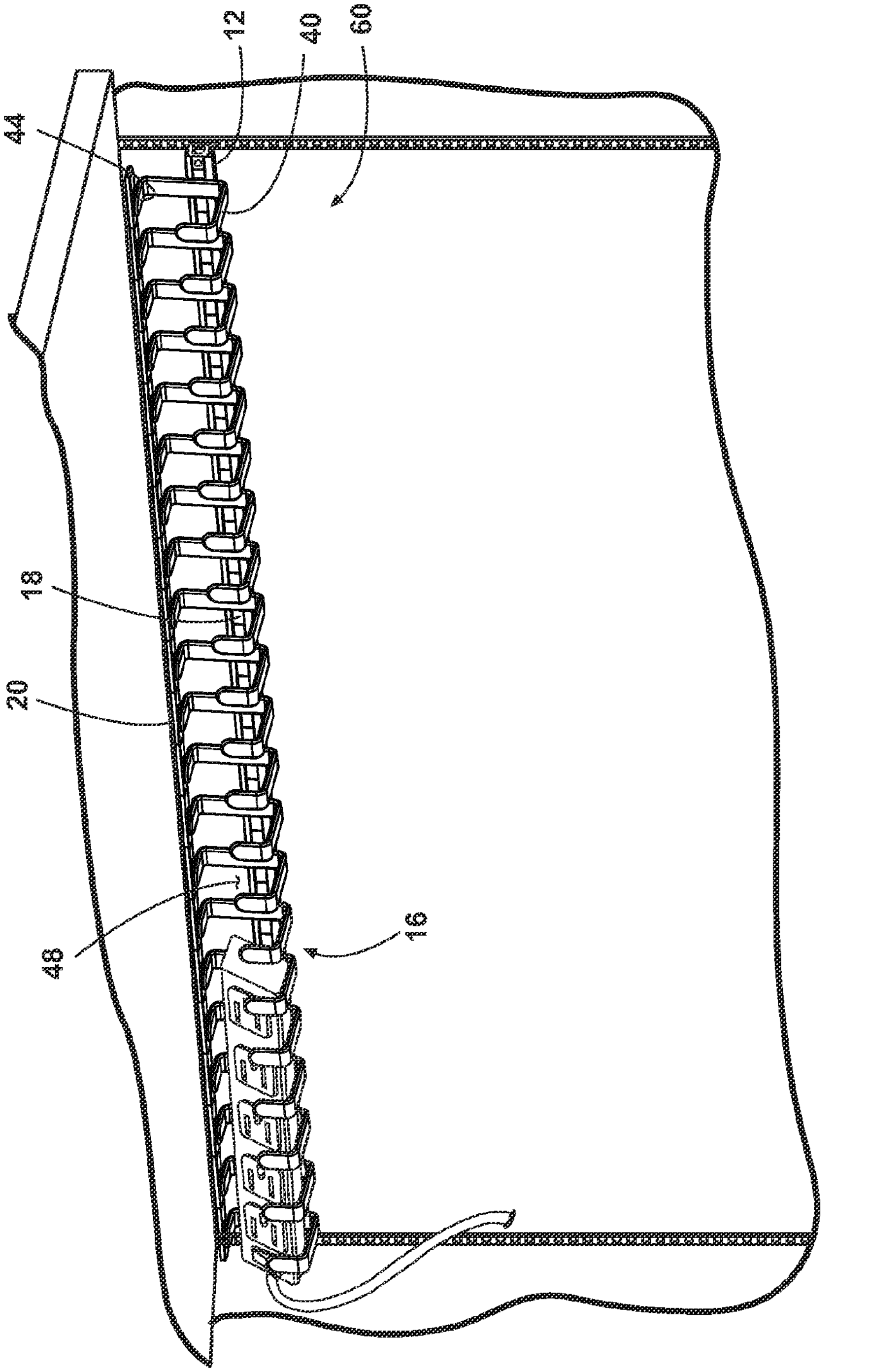
FIG. 3A is a perspective view of the cable and wire management device of FIG. 1 mounted to a vertical surface according to a second embodiment of the invention.
Figure 3B:
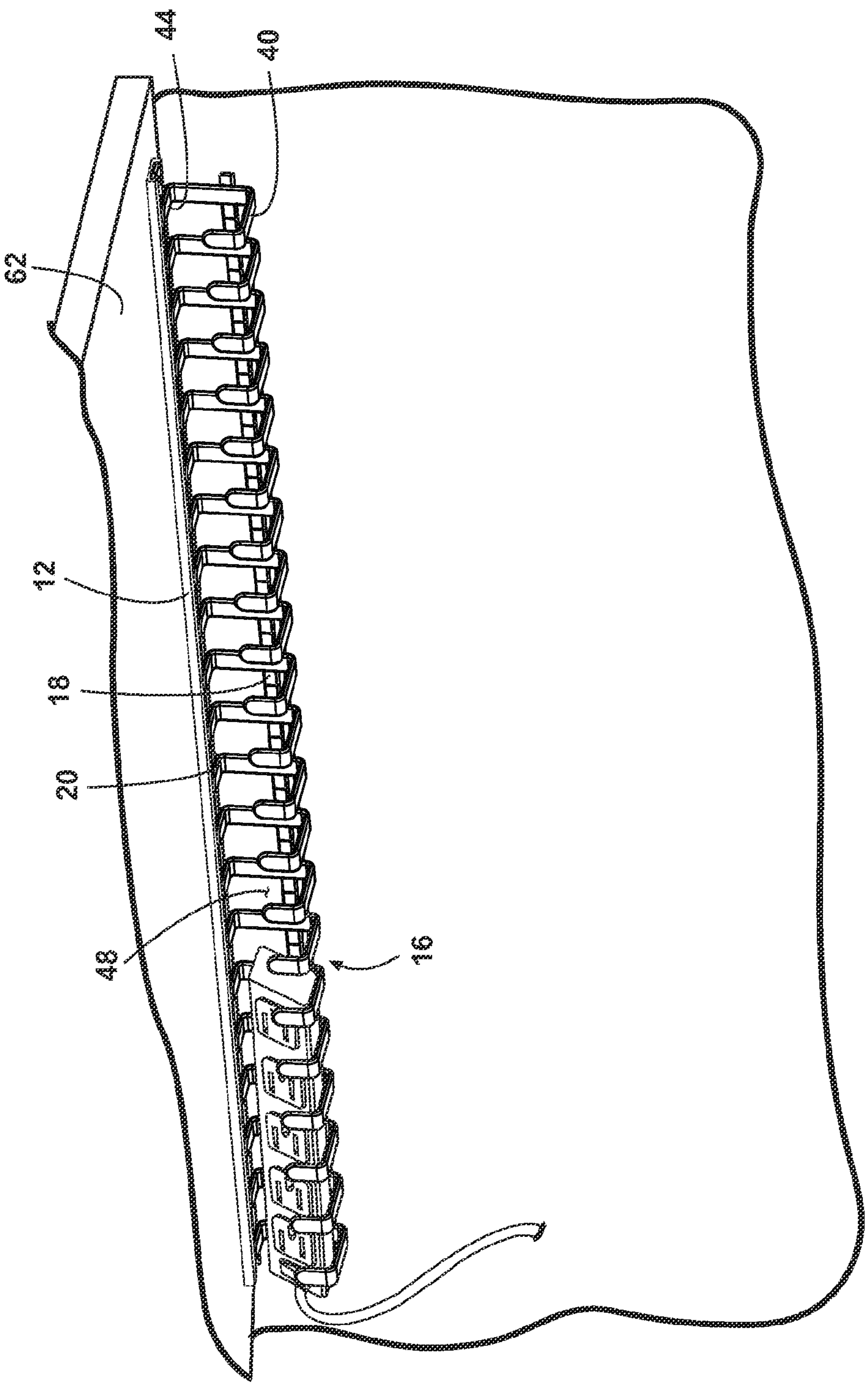
FIG. 3B is a perspective view of the cable and wire management device of FIG. 1 mounted to a horizontal surface according to a third embodiment of the invention.

As illustrated in FIGS. 3A and 3B, the dual first and second mounting tabs 18, 20 can be used to mount the hook members 16 to the track 12 such that the runway 48 and the first and second horizontal legs 42, 44, are parallel to a horizontal axis regardless of whether the track 12 is mounted to a vertical surface or a horizontal surface. FIG. 3A illustrates the track 12 mounted to a vertical surface such as an office furniture panel 60. The hook member 16 can be mounted to the track 12 by inserting the first mounting tab 18 into the raceway 14 and sliding it into position along the track 12.

When the track 12 is mounted to a horizontal surface, such as the underside of a table or desk 62, as illustrated in FIG. 3B, the hook member 16 can be mounted to the track 12 by inserting the second mounting tab 20 into the raceway 14 and sliding it into position. In this manner, the orientation of the runway 48 can be maintained along a horizontal axis.

Figure 4:
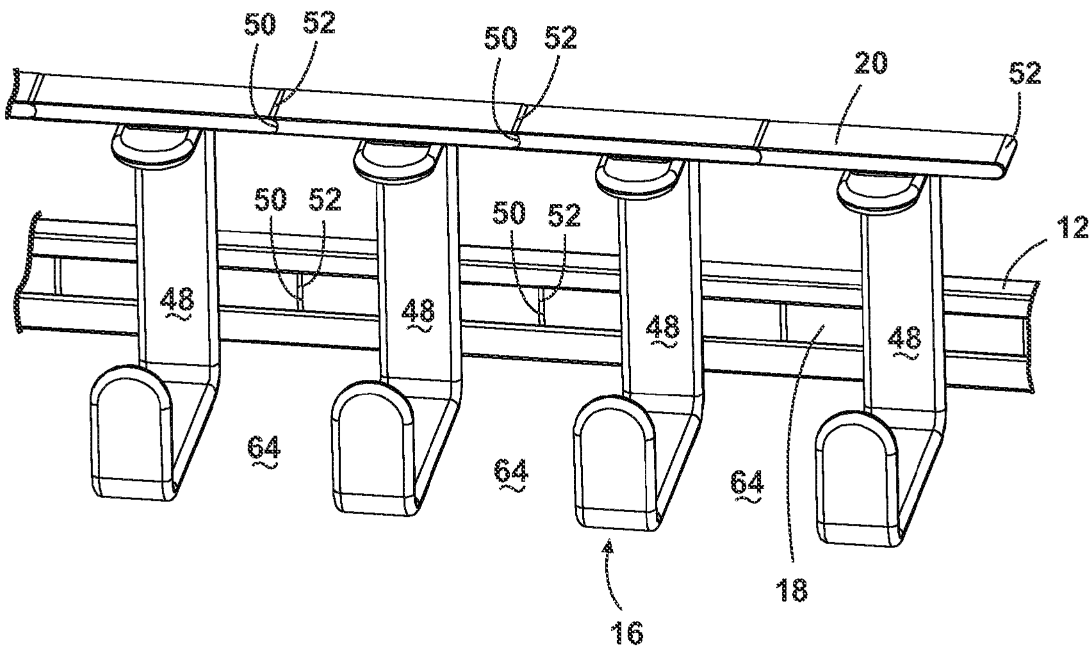
FIG. 4 is a close-up perspective view of the cable and wire management device of FIG. 1.

As can best be seen in FIG. 4, the first and second mounting tabs 18, 20 can be provided with an interlocking feature in the form of first and second interlocking features 50, 52 to facilitate alignment between adjacent hook members 16 and provide increased stability. The hook members 16 can be mounted to the track end-to-end such that the first interlocking feature 50 on the first and second mounting tabs 18, 20 of a first hook member 16 matingly receives the second interlocking feature 52 on the first and second mounting tabs 18, 20 of an adjacent hook member 16. In this manner, adjacent hook members 16 can be interlocked together along the length of the track 12.

The mounting tabs 18, 20 also provide uniform spacing between adjacent hook members 16. When the hook members 16 are mounted to the track 12 such that the mounting tabs 18, 20 of adjacent hook members 16 are interlocked together, the hook members are spaced along the track 12 at pre-defined intervals determined by the length of the mounting tabs 18, 20. The spacing of the hook members 16 provides entry and exit points 64 for cords and wires to enter or exit the runway 48 at any point along the track 12. The length of the mounting tabs 18, 20 and therefore the size of the entry and exit points 64 can be selected to provide a desired spacing depending on the size and type of electrical and office supply equipment being supported by the wire management device 10.

While the cable and wire management device 10 is illustrated as having hook members 16 mounted to the track 12 in an end-to-end manner such that the track 12 contains hook members 16 along its entire length, it is within the scope of the invention for any number of hook members 16 to be used with the track 12 having any desired spacing selected by the user. It is also within the scope of the invention for each hook member 16 to only be provided with a single mounting tab 18, 20, on either of the horizontal and vertical legs of the hook members 16.

Figure 5:
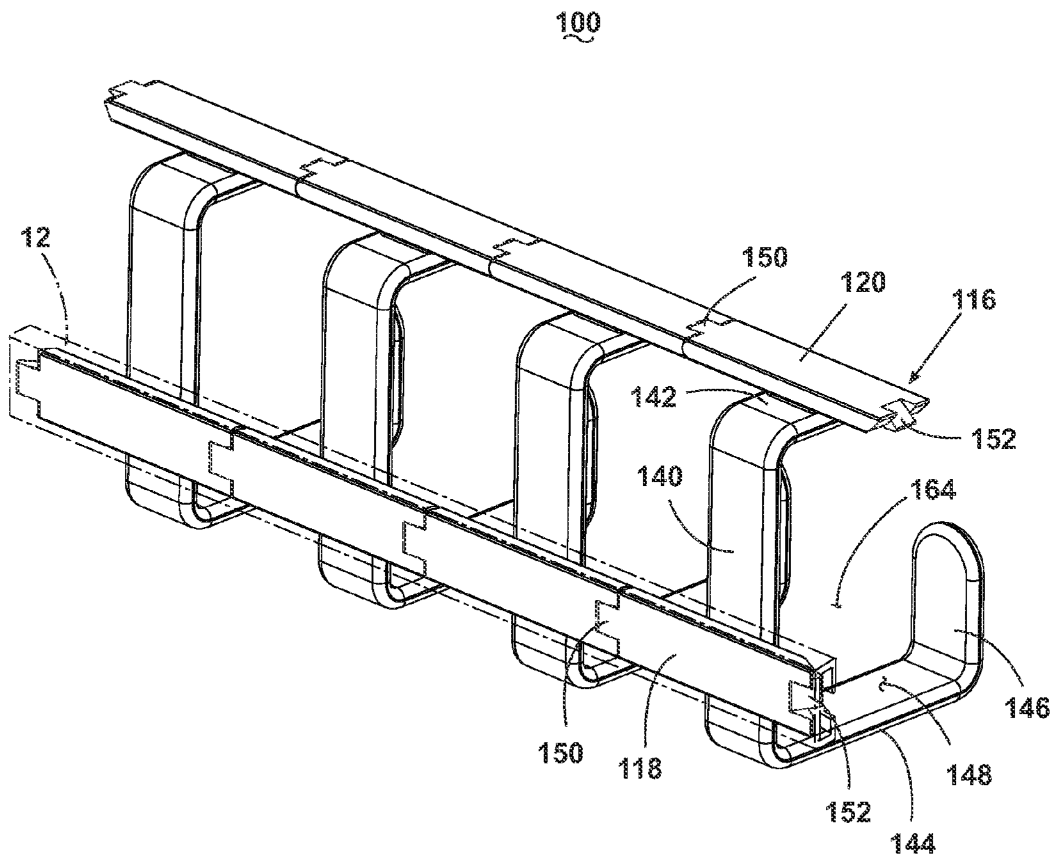
FIG. 5 is a perspective view of a cable and wire management device according to a fourth embodiment of the invention.

FIG. 5 illustrates a second embodiment of the invention comprising a hook member 116, which is similar to the hook member 16, except for the shape of the interlocking feature 150, 152. Therefore, elements in the hook member 116 similar to those in hook member 16 will be numbered with the prefix 100. Like elements shown in FIGS. 1-4 have their reference numerals increased by 100 for the example embodiment shown in FIG. 5.

As illustrated in FIG. 5, the cable and wire management device 100 comprises a generally J-shaped hook member 116 having a pair of first and second mounting tabs 118, 120 for mounting the hook member 116 to a track 12 in a manner similar to the embodiment illustrated in FIG. 1. The hook member 116 comprises a first vertical leg 140 connected with a first horizontal leg 142 at one end and a second horizontal leg 144 at a second end. The second horizontal leg 144 can be connected with a second vertical leg 146 at an end opposite the first vertical leg 140. The first mounting tab 118 can be located on a rear face of the first vertical leg 140; the second mounting tab 10 can be located on an upper face of the first horizontal leg 142. The first and second vertical legs 140, 146 and the first and second horizontal legs 142, 144 define a runway 148 for receiving wires, cords, power strips, USB port expanders, power supplies and other related electrical and office supply equipment.

The first and second mounting tabs 118, 120 can be formed integrally with, or connected with the first vertical and horizontal legs 140, 142, respectively by a weld or other type of non-mechanical fastener, such as an adhesive, or by any suitable type of mechanical fastener such as a screw or pin. The first and second mounting tabs 118, 120 are sized to be slidingly received within the raceway 14 of the track 12 and can be provided with a pair of first and second interlocking features 150, 152 on each end. The first and second interlocking features 150, 152 are formed by the reverse camming of the oppositely disposed surfaces of the first and second mounting tabs 118, 120 at each end of the mounting tabs 118, 120.

The first and second mounting tabs 118, 120 can be used to mount the hook members 116 to the track 12 in the same manner that the tabs 18, 20 can be used to mount the hook members 16 to the track 12 as illustrated in FIGS. 3A and 3B. The dual first and second mounting tabs 118, 120 can be used to mount the hook members 116 to the track 12 such that the runway 148 and the first and second horizontal legs 142, 144, are parallel to a horizontal axis regardless of whether the track 12 is mounted to a vertical surface, such as office furniture panel 60, or a horizontal surface, such as the underside 62 of a table or desk.

The first and second interlocking features 150, 152 facilitate alignment between adjacent hook members 116 and provide increased stability. The hook members 116 can be mounted to the track end-to-end such that the first interlocking feature 150 on the first and second mounting tabs 118, 120 of a first hook member 116 interlocks with the second interlocking feature 152 on the first and second mounting tabs 118, 120 of an adjacent hook member 116. In this manner, adjacent hook members 116 can be interlocked together along the length of the track 12.

The mounting tabs 118, 120 also provide uniform spacing between adjacent hook members 116. When the hook members 116 are mounted to the track 12 such that the mounting tabs 118, 120 of adjacent hook members 116 are interlocked together, the hook members are spaced along the track 12 at pre-defined intervals determined by the length of the mounting tabs 118, 120. The spacing of the hook members 116 provides entry and exit points 164 for cords and wires to enter or exit the runway 148 at any point along the track 12.

The cable and wire management device 10, 100 described herein provides a number of benefits. The cable and wire management device 10, 100 is capable of supporting cables and wires along with additional peripheral equipment such as power strips, power supplies, routers, modems, USB port expanders etc. The track 12 can be made of rigid material, such as extruded aluminum, that has sufficient strength that it is only required to be mounted to a surface at the ends thereof. This is a particularly useful property when mounting the track 12 to an office partition wall using brackets designed for use with the wall while not incurring damage to the wall such as might occur if multiple support fasteners were required along the length of the track 12.

Additionally, because the hook members 16, 116 are removably mounted to the track 12, the track 12 can be provided in any suitable length and the desired number of hook members 16, 116 can be purchased by the consumer depending on the length of the track. When made from materials such as aluminum, the track 12 can easily be modified in the field to a desired length by the user using commonly available tools, such as a wood saw or hack saw.

The mounting tabs 18, 20 and 118, 120 provide the cable and wire management device 10, 100 with additional benefits. The dual first and second mounting tabs 18, 20 and 118, 120 provide the ability to support cables, wires and other equipment regardless of whether the track 12 is mounted to a vertical surface, such as a wall, or to a horizontal surface, such as underneath a desk. This is an especially desirable property as it provides the user with more flexibility in managing cables, wires and other peripherals in a variety of different environments. The mounting tabs 18, 20 and 118, 120 also provide spacing along the whole length of the management device 10, 100 that provides easy access exit and entry points 64, 164 for cables and wires along the entire length of the device. Cables and wires can enter or exit the management device 10, 100 at any point along the length of device, facilitating ease of use of the management device 10, 100, especially in environments where there are multiple cables and wires extending from different devices spaced at different locations. In addition, the open-hook design of the hook members 16 and 116 allow a user to insert a length of wire through the opening between the first horizontal leg 42, 142 and the second vertical leg 46, 146, respectively, rather than fishing or threading a length of wire from one end of the device to the other. This can save the user a lot of time and hassle. The mounting tabs 18, 20 and 118, 120 can also be provided with interlocking features 50, 52 and 150, 152, respectively, that facilitate alignment of the hook members 16, 116 within the track 12 and provide additional stability.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cable and wire management device comprising:

a track; and a plurality of hook members defining a runway for supporting cables and wires parallel to a horizontal axis when mounted adjacent to one another within the track, wherein each of the plurality of hook members comprises a first mounting tab and a second mounting tab for selectively mounting the hook member to the track by either the first mounting tab or the second mounting tab;

wherein one of the first and second mounting tabs are positioned on the plurality of hook members to mount the hook members to the track when the track is mounted to a vertical surface and the other of the first and second mounting tabs mounts the hook members to the track when the track is mounted to a horizontal surface such that the runway is parallel to the horizontal axis and wherein the plurality of hook members can be located next to one another by abutting at least one of the first and second mounting tabs of adjacent hook members against one another to provide uniform spacing for the plurality of hook members along a length of the track.

2. The cable and wire management device of claim 1 wherein a gap between adjacent hook members defines an exit and entry point to the runway.

3. The cable and wire management device of claim 2 wherein a width of the exit and entry point is defined by a length of at least one of the first and second mounting tabs.

4. The cable and wire management device of claim 2 wherein when a plurality of hook members are mounted to the track, the gaps between adjacent hook members define multiple exit and entry points to the runway.

5. The cable and wire management device of claim 1 wherein one of the plurality of hook members comprises a generally elongated body with a first member extending laterally from a first end thereof and a second member extending laterally in the same direction from a second end thereof, wherein the second member has an upturned end at an outer end thereof, wherein one of the first and second mounting tabs is mounted to the first member, and the other of the first and second mounting tabs is mounted to the elongated body.

6. The cable and wire management device of claim 1 wherein at least one of the first and second mounting tabs is provided with an interlocking feature that is received by a corresponding interlocking feature on at least one of the first and second mounting tabs of an adjacent hook member.

7. The cable and wire management device of claim 1 wherein the runway is sized so as to receive at least one cable, wire, cord, power strip, USB port expander, router, power supply or combinations thereof.

8. The cable and wire management device of claim 1 wherein the horizontal surface is an underside of at least one of a table, desk or countertop.

9. The cable and wire management device of claim 1 wherein the track comprises mounting brackets for mounting to a wall partition.

10. The cable and wire management device of claim 1 wherein the track is mounted to one of the vertical or horizontal surfaces by at least one screw.

11. A cable and wire management device comprising:

a hook member comprising a generally elongated body with a first member extending laterally from a first end thereof and a second member extending laterally in the same direction from a second end thereof, wherein the second member has an upturned end at an outer end thereof;

a first mounting tab mounted atop the first member and extending dimensionally beyond a width of the first member between ends of the first member; and a second mounting tab mounted atop the elongated body and extending dimensionally beyond a width of the elongated body between ends of the elongated body;

wherein the first and second mounting tabs are generally planar in configuration and the first mounting tab is positioned on the device in a plane generally orthogonal to the second mounting tab.

12. The cable and wire management device of claim 11 and further comprising a track defining a raceway sized to receive at least one of the first and second mounting tabs.

13. The cable and wire management device of claim 12 wherein the track provides a runway for supporting cables and wires parallel to a horizontal axis when a plurality of the hook members are mounted adjacent to one another within the track.

14. The cable and wire management device of claim 13 wherein one of the first and second mounting tabs mount the hook members to the track when the track is mounted to a vertical surface and the other of the first and second mounting tabs mounts the hook members to the track when the track is mounted to a horizontal surface such that the runway is parallel to the horizontal axis.

15. The cable and wire management device of claim 14 wherein when a plurality of hook members are mounted to the track, the plurality of hook members can be located next to one another by abutting at least one of the first and second mounting tabs of adjacent hook members against one another to provide uniform spacing for the plurality of hook members along a length of the track.

16. The cable and wire management device of claim 13 wherein a gap between adjacent hook members defines an exit and entry point to the runway.

17. The cable and wire management device of claim 16 wherein a width of the exit and entry point is defined by a length of at least one of the first and second mounting tabs.

18. The cable and wire management device of claim 16 wherein when a plurality of hook members are mounted to the track, the gaps between adjacent hook members define multiple exit and entry points to the runway.

* * * * *